US008261326B2

(12) United States Patent
Ben-Natan

(10) Patent No.: US 8,261,326 B2
(45) Date of Patent: Sep. 4, 2012

(54) NETWORK INTRUSION BLOCKING SECURITY OVERLAY

(75) Inventor: Ron Ben-Natan, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 12/109,688

(22) Filed: Apr. 25, 2008

(65) Prior Publication Data

US 2009/0271453 A1     Oct. 29, 2009

(51) Int. Cl.
*H04L 9/32* (2006.01)
*G06F 17/30* (2006.01)
(52) U.S. Cl. ............... 726/4; 726/11; 707/705; 709/201
(58) Field of Classification Search ....... 726/4; 707/204
See application file for complete search history.

(56) References Cited

U.S. PATENT DOCUMENTS

| | | | |
|---|---|---|---|
| 4,451,916 A | 5/1984 | Casper et al. |
| 4,611,205 A | 9/1986 | Eglise |
| 4,672,572 A | 6/1987 | Alsberg |
| 4,956,769 A | 9/1990 | Smith |
| 5,224,058 A | 6/1993 | Mickaels |
| 5,261,102 A | 11/1993 | Hoffman |
| 5,299,257 A | 3/1994 | Fuller et al. |
| 5,325,290 A | 6/1994 | Cauffman et al. |
| 5,355,474 A | 10/1994 | Thuraisngham et al. |
| 5,557,742 A | 9/1996 | Smaha et al. |
| 5,594,899 A | 1/1997 | Knudsen et al. |
| 5,606,668 A | 2/1997 | Shwed |
| 5,701,342 A | 12/1997 | Anderson et al. |
| 5,737,316 A | 4/1998 | Lee |
| 5,758,083 A | 5/1998 | Singh et al. |
| 5,825,772 A | 10/1998 | Dobbins et al. |
| 5,826,267 A | 10/1998 | McMillan |
| 5,828,666 A | 10/1998 | Focsaneanu et al. |
| 5,835,726 A | 11/1998 | Shwed et al. |
| 5,845,281 A | 12/1998 | Benson et al. |
| 5,848,233 A | 12/1998 | Radia et al. |

(Continued)

FOREIGN PATENT DOCUMENTS

EP         0398645         11/1990

(Continued)

OTHER PUBLICATIONS

Lunt et al., "IDES: A Progress Report," IEEE, 1990.

(Continued)

*Primary Examiner* — Jeffrey Pwu
*Assistant Examiner* — Samuel Ambaye
(74) *Attorney, Agent, or Firm* — Terrence J. Carroll; Edell, Shapiro & Finnan, LLC

(57) ABSTRACT

A database security overlay that identifies each network and local access gateway to a database, and monitors each access path from the identified gateways to analyze each connection to the database and block any connections determined to transport unauthorized or undesirable content. Access gateways that establish connections are identifiable by interprocess communication (IPC) mechanisms employed in accessing the database. An evaluator monitors access attempts, while a tapping mechanism on IPC mechanisms that provide the connections captures access attempts from the access gateways. The tapping mechanism intercepts and forwards access attempts to the evaluator to centralize and focus DB paths amid multiple local and external connections on the DB server. A lightweight check for each local access quickly determines if the access attempt warrants further scrutiny.

24 Claims, 8 Drawing Sheets

U.S. PATENT DOCUMENTS

| | | | |
|---|---|---|---|
| 5,881,225 | A | 3/1999 | Worth |
| 5,884,025 | A | 3/1999 | Baehr et al. |
| 5,953,707 | A | 9/1999 | Huang et al. |
| 5,961,582 | A * | 10/1999 | Gaines ............................... 718/1 |
| 5,963,642 | A | 10/1999 | Goldstein |
| 5,974,396 | A | 10/1999 | Anderson et al. |
| 5,978,788 | A | 11/1999 | Castelli et al. |
| 5,978,813 | A | 11/1999 | Foltz et al. |
| 6,009,475 | A | 12/1999 | Shrader |
| 6,016,491 | A | 1/2000 | Kou |
| 6,044,376 | A | 3/2000 | Kurtzman, II |
| 6,049,821 | A | 4/2000 | Theriault et al. |
| 6,052,447 | A | 4/2000 | Golden et al. |
| 6,061,797 | A | 5/2000 | Jade et al. |
| 6,070,243 | A | 5/2000 | See et al. |
| 6,075,926 | A | 6/2000 | Atkins et al. |
| 6,076,168 | A | 6/2000 | Fiveash et al. |
| 6,081,900 | A | 6/2000 | Subramaniam et al. |
| 6,085,191 | A | 7/2000 | Fisher et al. |
| 6,088,796 | A | 7/2000 | Cianfrocca et al. |
| 6,097,399 | A | 8/2000 | Bhatt et al. |
| 6,105,027 | A | 8/2000 | Schneider et al. |
| 6,119,236 | A | 9/2000 | Shipley |
| 6,122,403 | A | 9/2000 | Rhoads |
| 6,125,447 | A | 9/2000 | Gong |
| 6,151,601 | A | 11/2000 | Papierniak et al. |
| 6,192,476 | B1 | 2/2001 | Gong |
| 6,205,475 | B1 | 3/2001 | Pitts |
| 6,226,749 | B1 | 5/2001 | Carloganu et al. |
| 6,230,156 | B1 | 5/2001 | Hussey |
| 6,236,996 | B1 | 5/2001 | Bapat et al. |
| 6,253,321 | B1 | 6/2001 | Nikander et al. |
| 6,272,641 | B1 | 8/2001 | Ji |
| 6,279,010 | B1 | 8/2001 | Anderson |
| 6,298,327 | B1 | 10/2001 | Hunter et al. |
| 6,304,975 | B1 | 10/2001 | Shipley |
| 6,311,272 | B1 | 10/2001 | Gressel |
| 6,330,562 | B1 | 12/2001 | Boden et al. |
| 6,332,163 | B1 | 12/2001 | Bowman-Amuah |
| 6,336,996 | B1 | 1/2002 | Steiner |
| 6,341,312 | B1 | 1/2002 | French et al. |
| 6,347,374 | B1 | 2/2002 | Drake et al. |
| 6,347,376 | B1 | 2/2002 | Attwood et al. |
| 6,356,941 | B1 | 3/2002 | Cohen |
| 6,366,952 | B2 | 4/2002 | Pitts |
| 6,393,568 | B1 | 5/2002 | Ranger et al. |
| 6,442,748 | B1 | 8/2002 | Bowman-Amuah |
| 6,460,046 | B1 | 10/2002 | Meek |
| 6,480,861 | B1 | 11/2002 | Kanevsky et al. |
| 6,496,850 | B1 | 12/2002 | Bowman-Amuah |
| 6,505,241 | B2 | 1/2003 | Pitts |
| 6,529,909 | B1 | 3/2003 | Bowman-Amuah |
| 6,529,948 | B1 | 3/2003 | Bowman-Amuah |
| 6,532,465 | B2 | 3/2003 | Hartley et al. |
| 6,539,396 | B1 | 3/2003 | Bowman-Amuah |
| 6,550,057 | B1 | 4/2003 | Bowman-Amuah |
| 6,578,068 | B1 | 6/2003 | Bowman-Amuah |
| 6,581,052 | B1 | 6/2003 | Slutz |
| 6,601,192 | B1 | 7/2003 | Bowman-Amuah |
| 6,606,660 | B1 | 8/2003 | Bowman-Amuah |
| 6,609,123 | B1 | 8/2003 | Cazemier et al. |
| 6,615,253 | B1 | 9/2003 | Bowman-Amuah |
| 6,633,936 | B1 | 10/2003 | Keller et al. |
| 6,636,585 | B2 | 10/2003 | Salzberg et al. |
| 6,658,091 | B1 | 12/2003 | Naidoo et al. |
| 6,658,625 | B1 | 12/2003 | Allen |
| 6,678,355 | B2 | 1/2004 | Eringis et al. |
| 6,681,331 | B1 | 1/2004 | Munson et al. |
| 6,687,702 | B2 | 2/2004 | Vaitheeswaran et al. |
| 6,694,368 | B1 | 2/2004 | An et al. |
| 6,714,778 | B2 | 3/2004 | Nykanen et al. |
| 6,789,046 | B1 | 9/2004 | Murstein et al. |
| 6,807,546 | B2 | 10/2004 | Young-Lai |
| 6,820,082 | B1 | 11/2004 | Cook et al. |
| 6,842,105 | B1 | 1/2005 | Henderson et al. |
| 6,851,004 | B2 | 2/2005 | Keller et al. |
| 6,941,369 | B1 | 9/2005 | Krack et al. |
| 6,941,472 | B2 * | 9/2005 | Moriconi et al. ............... 726/11 |
| 7,038,611 | B2 | 5/2006 | Gounalis |
| 7,043,541 | B1 | 5/2006 | Bechtolsheim et al. |
| 7,080,077 | B2 | 7/2006 | Ramamurthy et al. |
| 7,085,834 | B2 | 8/2006 | Delany et al. |
| 7,089,322 | B1 | 8/2006 | Stallmann |
| 7,111,059 | B1 | 9/2006 | Garcea et al. |
| 7,171,413 | B2 | 1/2007 | Puz et al. |
| 7,231,378 | B2 | 6/2007 | Lawson et al. |
| 7,248,568 | B1 | 7/2007 | Loc et al. |
| 7,308,388 | B2 | 12/2007 | Beverina et al. |
| 7,337,105 | B2 | 2/2008 | Sugimoto |
| 7,342,896 | B2 | 3/2008 | Ayyagari |
| 7,426,512 | B1 | 9/2008 | Ben-Natan |
| 7,437,362 | B1 | 10/2008 | Ben-Natan |
| 7,506,371 | B1 | 3/2009 | Ben-Natan |
| 7,567,819 | B2 | 7/2009 | Alone et al. |
| 7,694,134 | B2 | 4/2010 | Witt et al. |
| 7,904,454 | B2 | 3/2011 | Raab |
| 7,933,923 | B2 | 4/2011 | Ben-Natan |
| 7,970,788 | B2 | 6/2011 | Ben-Natan et al. |
| 2002/0007363 | A1 | 1/2002 | Vaitzblit |
| 2002/0010800 | A1 | 1/2002 | Riley et al. |
| 2002/0019944 | A1 | 2/2002 | Kou |
| 2002/0027907 | A1 | 3/2002 | Tateoka |
| 2002/0059451 | A1 | 5/2002 | Haviv |
| 2002/0066033 | A1 | 5/2002 | Dobbins et al. |
| 2002/0066038 | A1 | 5/2002 | Mattsson et al. |
| 2002/0078384 | A1 | 6/2002 | Hippelainen |
| 2002/0095496 | A1 | 7/2002 | Antes et al. |
| 2002/0095603 | A1 | 7/2002 | Godwin et al. |
| 2002/0104017 | A1 | 8/2002 | Stefan |
| 2002/0129140 | A1 | 9/2002 | Peled et al. |
| 2002/0129271 | A1 | 9/2002 | Stanaway et al. |
| 2002/0133723 | A1 | 9/2002 | Tait |
| 2002/0147726 | A1 | 10/2002 | Yehia et al. |
| 2002/0147927 | A1 | 10/2002 | Tait |
| 2002/0152399 | A1 | 10/2002 | Smith |
| 2002/0154646 | A1 | 10/2002 | Dubois et al. |
| 2002/0157020 | A1 | 10/2002 | Royer |
| 2002/0177910 | A1 | 11/2002 | Quarterman et al. |
| 2003/0028624 | A1 | 2/2003 | Hasan et al. |
| 2003/0046302 | A1 | 3/2003 | Miron |
| 2003/0056200 | A1 | 3/2003 | Li et al. |
| 2003/0084320 | A1 | 5/2003 | Tarquini et al. |
| 2003/0084328 | A1 | 5/2003 | Tarquini et al. |
| 2003/0182580 | A1 | 9/2003 | Lee |
| 2003/0217069 | A1 | 11/2003 | Fagin et al. |
| 2003/0217149 | A1 | 11/2003 | Crichton et al. |
| 2004/0024764 | A1 | 2/2004 | Hsu et al. |
| 2004/0054927 | A1 * | 3/2004 | Leppanen et al. ............ 713/201 |
| 2004/0093506 | A1 | 5/2004 | Grawrock et al. |
| 2004/0098415 | A1 * | 5/2004 | Bone et al. .................... 707/200 |
| 2004/0111344 | A1 | 6/2004 | Fetter et al. |
| 2004/0111623 | A1 | 6/2004 | Miller et al. |
| 2004/0117037 | A1 | 6/2004 | Hinshaw et al. |
| 2004/0143733 | A1 | 7/2004 | Ophir et al. |
| 2004/0255301 | A1 | 12/2004 | Turski et al. |
| 2004/0260947 | A1 | 12/2004 | Brady et al. |
| 2005/0005031 | A1 | 1/2005 | Gordy et al. |
| 2005/0071650 | A1 | 3/2005 | Jo et al. |
| 2005/0086529 | A1 | 4/2005 | Buchsbaum |
| 2005/0097149 | A1 | 5/2005 | Vaitzblit et al. |
| 2005/0149537 | A1 | 7/2005 | Balin et al. |
| 2005/0203921 | A1 * | 9/2005 | Newman et al. .............. 707/100 |
| 2006/0059154 | A1 | 3/2006 | Raab |
| 2006/0143707 | A1 | 6/2006 | Song et al. |
| 2006/0242431 | A1 | 10/2006 | LeCrone et al. |
| 2007/0107052 | A1 | 5/2007 | Cangini et al. |
| 2007/0112864 | A1 | 5/2007 | Ben-Natan |
| 2007/0118534 | A1 | 5/2007 | Hayes et al. |
| 2007/0180275 | A1 | 8/2007 | Metzger et al. |
| 2008/0011843 | A1 | 1/2008 | Barenburg et al. |
| 2008/0033960 | A1 | 2/2008 | Banks et al. |
| 2008/0275843 | A1 * | 11/2008 | Lal et al. ........................... 707/3 |
| 2010/0131512 | A1 | 5/2010 | Ben-Natan et al. |
| 2010/0131758 | A1 | 5/2010 | Ben-Natan |
| 2010/0132024 | A1 | 5/2010 | Ben-Natan et al. |
| 2011/0313981 | A1 | 12/2011 | Ben-Natan |

FOREIGN PATENT DOCUMENTS

| | | |
|---|---|---|
| WO | 98/31124 A1 | 7/1998 |
| WO | 99/66384 A2 | 12/1999 |

OTHER PUBLICATIONS

Jones Katherine, "Secure Internet Access to SAP's R/3: Keeping Dragons Out," Int. J. Network Mgmt., vol. 8 © 1998, pp. 191-199.

Joshi, James B. D., et al., "Security Models for Web-Based Applications," Communications of the ACM, vol. 44, No. 2, Feb. 2001, pp. 38-44.

Muller, Nathan J., "Improving Network Operations With Intelligent Agents," Int. J. Network Mgmt., vol. 7, © 1997, pp. 116-126.

Jaeger, T., et al., "Flexible Access Control Using IPC Redirection," Proc. of the 7th Workshop on Hot Topics in Operating Systems, Mar. 29-30, 1999, pp. 191-196.

Roscheisen, Martin, et al., "A Communication Agreement Framework for Access/Action Control," 1996 IEEE Symposium on Security and Privacy, © 1996, pp. 154-163.

Appenzeller, Guido, et al., "User-Friendly Access Control for Public Network Ports," IEEE 0-7803-5417-6/99, © 1999, pp. 699-707.

Balasubramaniyan, Jai Sundar, et al., "An Architecture for Intrusion Detection Using Autonomous Agents," 14th Annual Computer Security Applications Conf. Proc., Phoenix, AZ, Dec. 7-11, 1998, pp. 13-24.

Gangadharan, Muralidaran, et al., "Intranet Security with Micro-Firewalls and Mobile Agents for Proactive Intrusion Response," IEEE Int'l Conf. on Computer Networks and Mobile Computing, Beijing, China, Oct. 16-19, 2001, pp. 325-332.

Miller, Sandra Kay, "The Trusted OS Makes a Comeback," Computer, vol. 34, Issue 2, Feb. 2001, pp. 16-19.

Microsoft Computer Dictionary, 5th Edition, Microsoft Press, Redmond WA, © 2002, p. 22.

Chari, Suresh N., et al., "BlueBoX: A Policy-Driven, Host-Based Intrusion Detection System," ACM Transactions on Information and System Security, vol. 6, No. 2, May 2003, pp. 173-200.

Schepers, Filip, et al., "Network-Versus Host-Based Intrusion Detection," Information Security Technical Report, vol. 3, Issue 4, © 1998, pp. 32-42.

Levine, John, et al., "The Use of Honeynets to Detect Exploited Systems Across Large Enterprise Networks," Proc. of the 2003 IEEE Workshop on Information Assurance, West Point, NY, Jun. 18-20, 2003, pp. 92-99.

Kewley, Dorene L., et al., "DARPA Information Assurance Program Dynamic Defense Experiment Summary," IEEE Transactions on Systems, Man and Cybernetics—Part A: Systems and Humans, vol. 31, No. 4, Jul. 2001, pp. 331-336.

Ron Ben Natan, Implementing Database Security and Auditing: A Guide for DBAs, information security administrators and auditors, Elsevier Digital Press (May 2, 2005) pp. 95-108, 177-201, 242-266, 278-293, 324-326, 340-391.

Newman, Aaron, Security Auditing in Microsoft SQL Server (Nov. 3, 2005) [retrieved from http://web.archive.org./web/20051227161250/www.appsecinc./presentations/Security_Auditing_MSSQL.pdf on Apr. 6, 2010].

Applicaton Security, Inc. AppRadar User Guide (Nov. 3, 2005) [retrieved from http://web.archive.org.web/20050204172218/http://www/appsecinc.com/techdocs/AppDetectiveUG.pdf on Apr. 5, 2010].

Guardium Press Release, "Guardium Introduces SQL Guard" (Feb. 9, 2004) [retrived from http://www.guardium.com/index.php/prprint/390 on Mar. 19, 2010].

Webster's II New College Dictionary. Houghton Mifflin Co. (1995). p. 231.

Deri, L; Carbone R; Suin, S. Monitoring Networks Using Ntop (2001) [Retrieved from http://citeseer.ist.psu.edu/old/414959.html on Apr. 7, 2010].

Roesch, Martin. SNORT—Lightweight Intrusion Detection for Networks. Proceedings of LISA '99 13th Systems Administration Conference (Nov. 7-12, 1999) pp. 229-238 [retrieved from http://www.unenix.org on Apr. 6, 2010].

Silberzchatz, A; Korth, H.; Sudarshan, S. Database System Concept. 5th Edition. McGraw-Hill Publishing (May 17, 2005) pp. 934-936, 1078-1079.

Guardium, Inc. Auditing, Compliance, and Privacy Through Effective Controls on Data Access and Usage (Mar. 22, 2005) [retrieved from http://guardium.com on Apr. 6, 2010].

Dar et al., "dbSwitchtm: towards a database utility," Proceedings of the 2004 ACM SIGMOD international conference on Management of data, Jun. 2004 p. 892-896. Retrived from the Internet <URL:http//portal.acm.org/ft_gateway.cfm?id=1005726&type=pdf&coll=ACM&CFID=59243114&CFTOKEN=20435778>.

Feamster et al., "A model of BGP routing for network engineering," Proceedings of the joint international conference on Meaurement and Modeling of computer systems, Jun. 2004, p. 331-342. Retrieved from the internet:URL: http://portal.acm.org/ft_gateway.cfm?id=1005726&type=pdf&coll=ACM&dl=ACM&CFID=59243114&CFTOKEN=20435778>.

SQL Guard Version 4.0.2 User Guide, Aug. 18, 2005.

SQL Guard Version 4.0.2 Administrator Guide, Aug. 18, 2005.

User Guide for SQL Guard Version 5.1, Jul. 14, 2006.

Administrator Guide for SQL Guard Version 5.1, Jul. 21, 2006.

Rao et al., "A New Neural Network Architecture for Efficient Close Proximity Match of Large Databases", Database and Expert Systems Applications, 1997, Proceedings Eighth International Workshop Toulouse, France, Sep. 1-2, 1997, IEEE Comput. Soc. Sep. 1, 1997, pp. 444-449.

Oyama, et al., "Speculative Security Checks in Sandboxing Systems," (Apr. 2005), Proceedings of the 2005 International Parallel and Distributed Processing Symposium (IPDS).

Mukhar et al., "Beginning Java Databases," (2001), Wrox Press Ltd., pp. 262-264.

Gray, "Interprocess Communications in Linux," (2003), Pearson Hall PTR, pp. 451-453.

\* cited by examiner

NETWORK INTRUSION BLOCKING SECURITY OVERLAY

BACKGROUND

Database security is becoming an increasingly imperative aspect of modern business practices as breaches of repositories containing sensitive information evoke high profile headlines, and resulting damages stemming from such a breach can be substantial. There is a modern trend towards a heightened duty that keepers of sensitive information have towards safeguarding databases from unauthorized access. Further, when such breaches do occur, it becomes equally as important to identify the scope of the breach so that appropriate mitigation activities may ensue. Accordingly, database access control and auditing mechanisms are often employed to protect and monitor access to a database.

Traditional database (DB) security has focused on user based security, typically via access based control. Such an approach establishes a privileged class of users, such as administrators and supervisory personnel. A presumption of trust tends to accompany these "super user" roles, since they are empowered with substantial access privileges, including the ability to modify the privileges of other users to include the "super user" status. Modern security implementation and auditing principles, however, strive for complete access coverage and monitoring. Exemption of a particular subset of such super users avoids the finely tuned scrutiny demanded by modern security approaches.

SUMMARY

Modern database security includes data based techniques, which focus on the content of the accessed data, rather than traditional access based methods which address only who is requesting access. Such data based methods allow a rule-based approach which provides a high granularity of access control, thus avoiding overly restrictive constraints which may hamper legitimate access. However, conventional network path approaches suffers from the shortcoming that certain privileged paths, or local database accesses, such as those from a DBA (database administrator), maintenance, or other trusted application may evade even data-based security of a DB server since they access the box (server) directly through the local connection. Unfortunately, attempts to replicate the network appliance via a local agent or other processing then burdens the server with such security processing, degrading overall performance.

Accordingly, configurations herein substantially overcome the shortcomings of a network path approach by performing a lightweight, or first stage, check on the local database accesses to identify suspect connections, and transmitting access attempts on the suspect connections to the appliance in a second stage for more robust scrutiny. In this manner, the local lightweight check coupled with the network appliance provides a complete security overlay for both local and remote database access attempts, and relieves the database host and database management systems (DBMS) from performing the rule based check on the access attempts, thus relieving integration issues which may arise from retrofitting an existing DB installation with a local access check. The security overlay approach disclosed below entails no changes to the application or database schema/definitions, avoiding a need to rearchitect or redeploy DB applications.

The configurations discussed below disclose a database security overlay that identifies each access gateway to a database, and monitors each access path from the identified gateways to analyze each connection to the database and block, monitor, and/or log any connections determined to transport unauthorized or undesirable content from a single common point or path to the database, thus covering all local and remote access paths. The two phase approach provides an immediate lightweight check via attributes of the connection, and an exchange with an external evaluator if the connection attributes are not deterministic of the responsive action. Local access gateways that establish local connections are identifiable by interprocess communication (IPC) mechanisms employed in accessing the database, and remote gateways arrive via external network connections. An evaluator disposed on the external network connection monitors remote access attempts, while a tapping mechanism on IPC mechanisms that provide the local connections captures access attempts from the local access gateways. The tapping mechanism intercepts and forwards local access attempts to the evaluator to mitigate processing demands of monitoring the access attempts on the local DB server. Since interception of the database transactions is performed at the IPC level, no database specific calls or approaches are employed, thus the overlay operates in a heterogeneous manner with respect to individual DBMS implementations/vendors, even for multiple DBMS installations on the same server.

A lightweight check for each access quickly determines if the access attempt warrants further scrutiny. A response to the access attempt is blocked pending a verdict from the evaluator, however, in view of enhanced performance, lower risk connections may be allowed to proceed pending a later verdict on the connection. The tapping mechanism monitors each IPC mechanism to the database, such as kernel calls, sockets, and shared memory, for forwarding to the evaluator, therefore addressing 1 DB access from all access paths via a single common access point. In this manner, each connection to the database, is scrutinized without burdening the database server with computing the propriety of each access attempt. Therefore, the scrutinizer provides a first stage screening of database connections via the lightweight check on connection attributes at a connection table, while the evaluator completes a second stage against a full set of access rules via a transactional exchange. This two stage approach is such that a rule is applied that decides, for example, that a DB connection needs to be watched and once watched (and therefore certain attributes like delays or redaction attached to the connection), responses from further rules (verdicts) are waited-on while the results computed by the evaluator.

In further detail, the configurations herein provide a method and apparatus for scrutinizing database connections by receiving a transaction requesting to access a database, in which the transaction is received on a connection between the database and an access portal, and identifying, via a lightweight check, connection attributes such as a watch status of the database connection, such that the connection attributes are indicative of a level of scrutiny to be applied to the connection. The lightweight check is performed by fetching a predetermined label corresponding to the connection from a table of connections to the database. A scrutinizer in the database server perform the lightweight check, and selectively transmits, based on the connection attributes such as the watch status being indicative of a need to analyze the connection, the received transaction to an evaluator, in which the evaluator is operable to apply a set of access rules for determining a verdict specifying whether the transaction is a suspect transaction indicative of undesirable access. The scrutinizer receives the verdict from the evaluator, such that the verdict is indicative of a responsive action (i.e. terminate the connection) based on applying the set of access rules to the transaction, and the scrutinizer then applies the responsive action to the transaction, in which the responsive action indicates whether to allow subsequent transactions on the connection to proceed.

In the example arrangement discussed further below, the evaluator is disposed external to the DB server, and may be connected on a network path to the database, and the received transaction comprises a plurality of received transactions, such that the evaluator applies the same set of access rules to both the transactions from the network path, and to the received (local) transactions based on the watch status being indicative of a need to analyze the connection. While the evaluator may be disposed on the network path and operable to perform direct interception of database transactions, the scrutinizer may nonetheless be configured to intercept both local and remote network traffic and forward the traffic to the evaluator such that all access paths receive similar treatment. Privileged accounts and numerous network access paths are mitigated by intercepting at a common access point via IPC intercepts of database access requests.

Connection requests to the database are employed to generate a lightweight table responsive to the lightweight check, such that generating includes receiving a connection request for connecting to the database, and identifying an origin and a user from which the connection request was received. The scrutinizer determines, from the identified origin and the user, the connection attributes corresponding to the connection. The determined attributes, such as a watch status, delay indicator, redaction indicator, and priority buffer are indicative of whether the connection attributes alone are conclusive of a responsive action for each particular transaction, whether transactions on the connection need be sent to the evaluator for a verdict, or waived if the connection is deemed low risk.

Discussed below is an example configuration for which mitigating risk of the so-called superusers (e.g. DBAs) is paramount. DBAs and other privileged users with system privileges typically can access any data in any schema. There is no need to explicitly grant privileges to objects containing PIT data and there is no way (in all databases) to limit such access. Preventing such access (mostly preventing SELECTs) is required by multiple regulations and in many geographies. This is usually solved through monitoring and real-time alerting but many are moving to prevention as a way to reduce cost (of review). Monitoring is also viewed as a compensating control whereas prevention is the real compliance requirement. Note that while SELECT statements are the most common, there are many activities that need to be prevented—e.g. the DBA should not be able to create a view based on the sensitive data. Particular troublesome scenarios are numerous. The differences are in what the rules are based on—e.g. based on user accounts, based on which IP or subnet the connection comes from, based on which application is making the request, based on the time of day, based on which schema and database objects are accessed, etc.

A further shortcoming of conventional DB security is presented with outsourced DBAs. Companies that outsource DBA positions are extremely sensitive to what external users have access to. This use case is a subset of the previous one but gets more visibility and priority. This use case also gets special attention due to the possibility of changes to business-affecting data. In the previous use case the focus is often on access to sensitive data and is often related to PII. However, there is also a similar use case involving business-affecting data. In this use case the focus is usually not only on access to data but even more on the ability that a DBA has to change data (i.e. DML vs. SELECT). While this scenario is as valid for internal DBAs as it is to outsourced work, internal implementations are often based on monitoring and auditing whereas outsourced scenario often require better preventive controls or at the very least a monitoring system that is not dependent on database functions.

A further environment to which the disclosed configurations are beneficial is one with a need to provide segmentation of applications and their related data. Because multiple applications often live in the same instance or on the same operating system and because users with system privileges can access data across these schema and database boundaries, there is a need to enforce policies in which privileged users of one application cannot connect to the schema of another application, even when running on the same instance or machine.

In alternate arrangements, the connection attributes include a redaction indicator to employ a masking or redacting arrangement with particularly sensitive data (e.g. credit card numbers) returned from the DB. In this arrangement, the evaluator receives a 3-tuple including the unredacted data for analysis, the subset of data to be redacted (i.e. which part of a string), and the format for applying the redaction. Analysis is performed on the sensitive data, however data returned is masked according to the 3-tuple, e.g. last 4 digits of credit card No., for example.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The database security overlay as disclosed in an example configuration below provides database access control covering each access path into the database, in contrast to conventional methods which cover only a particular access portal. In a typical database, much of the access traffic occurs via network transport; the remainder occurs via local access gateways such as operator consoles. Accordingly, configurations herein cover either access by intercepting invocations of a local IPC mechanism used between a user access gateway (i.e. operator console) and the database. The intercepted communications undergo a two-stage check; first a screening based on the type of connection to determine if the connection warrants further scrutiny, and a second rule based check on the contents of the communications. Alternatively, the full rule based check may be implemented by disposing the evaluator on a network path for intercepting all communications; this is a configuration aspect which may be affected by the number of network paths into the DB server.

Figure 1:
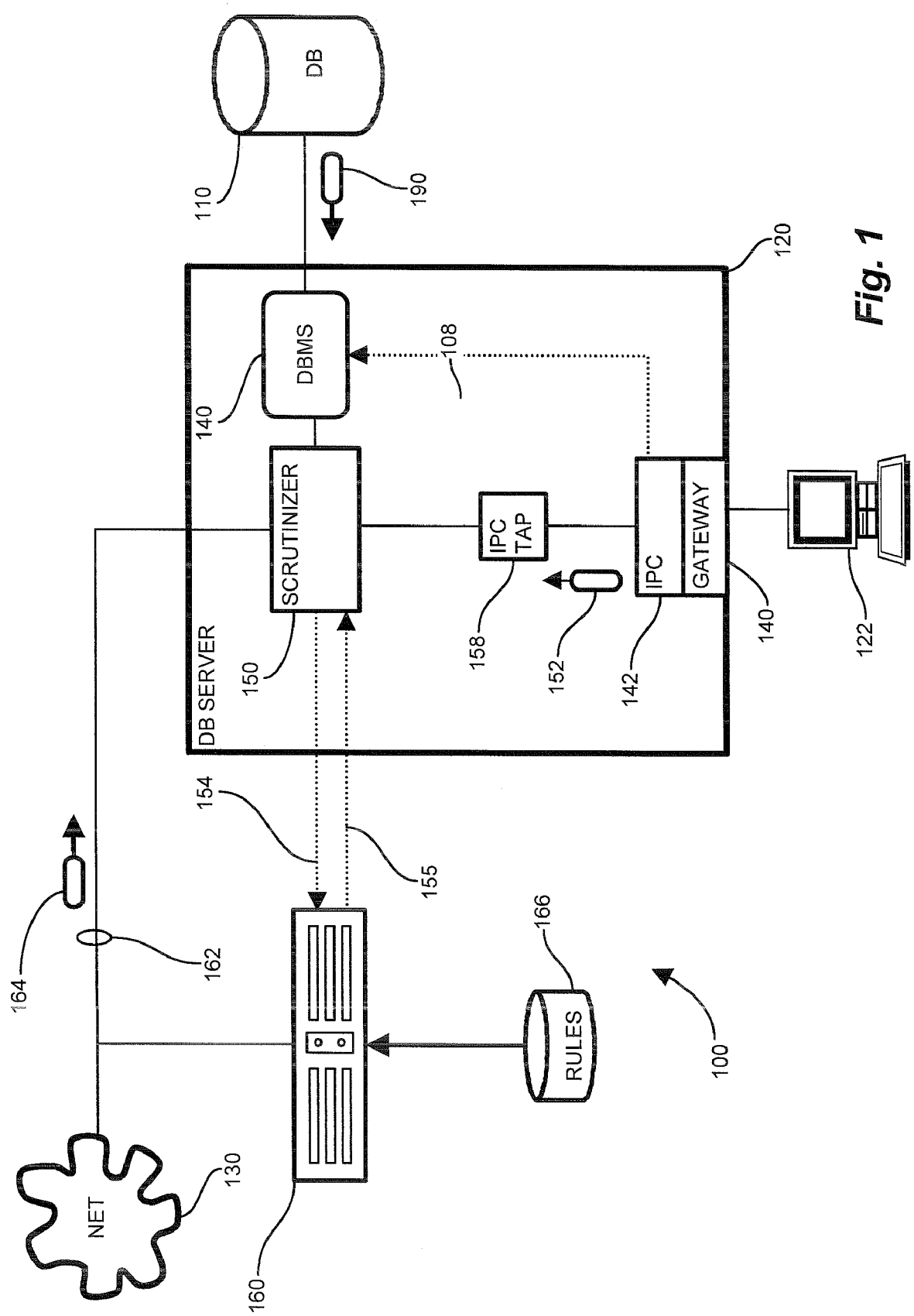
FIG. 1 shows a context view of including a database computing environment suitable for use with the present invention.

FIG. 1 shows a context view of including a database computing environment suitable for use with the present invention. Referring to FIG. 1, a database computing environment 100 includes a database 110 responsive to a server 120, a network 130 interconnecting the server 120 with remote users 122, and one or more local access gateways 140 providing local database access via an IPC mechanism 142. A tap 158 establishes an intercept of IPC mechanisms employed from the access gateways 140, such as shared memory, sockets, and system calls. The tap 158 therefore intercepts local received transactions 152 which would have otherwise proceeded to the database unhindered, as shown by arrow 108. Further discussion of the IPC tap 158 mechanism is provided in copending U.S. patent application Ser. No. 11/195,387, filed Aug. 2, 2005, entitled "SYSTEM AND METHODS FOR SELECTIVE LOCAL DATABASE ACCESS RESTRICTION", incorporated herein by reference. A scrutinizer 150 in the server 120 receives intercepted local transactions 152 for immediate comparison with connection attributes, while an evaluator 160 receives transactions for evaluating transactions further against the set of access rules 166 if called for by the connection attributes. Alternatively, the evaluator 160 may be disposed on a network path 162 to directly receive remote transactions 164 from the network 130.

Collectively, the evaluator 160 coupled to the scrutinizer 150 effectively provides coverage for all database transactions (access attempts), whether local or remote. The scrutinizer therefore operates the same whether the connection is networked 162 or local 158 because in both cases the database server 120 acts as one of the endpoints. Alternatively, the evaluator 160, in an alternate configuration, may be disposed directly accessing the network path 162, to passively "sniffs" actively block the remote/network access attempts. In either case, the evaluator 160 compares the transactions 164 against a set of rules 166 indicative of improper or disallowed transactions. The scrutinizer 150 monitors connections by identifying a type of the transaction 152 via a lightweight check, and sends the transaction 152 to the evaluator 160 for comparison with the set of rules 166, shown by dotted line 154. The lightweight check, discussed further below, is intended to screen transactions 152 to allow trusted traffic to pass unhindered if the connection attributes alone can render a responsive action, while routing less trusted traffic to the evaluator 160 for further processing. Note that a variety of network configurations may be employed, and the scrutinizer 150 need not be employed for only local connections. Configurations having multiple network ingress points may find it beneficial to establish scrutinizer 150 based protection via a connection table rather than monitoring/capturing each network path 162.

Figure 2:
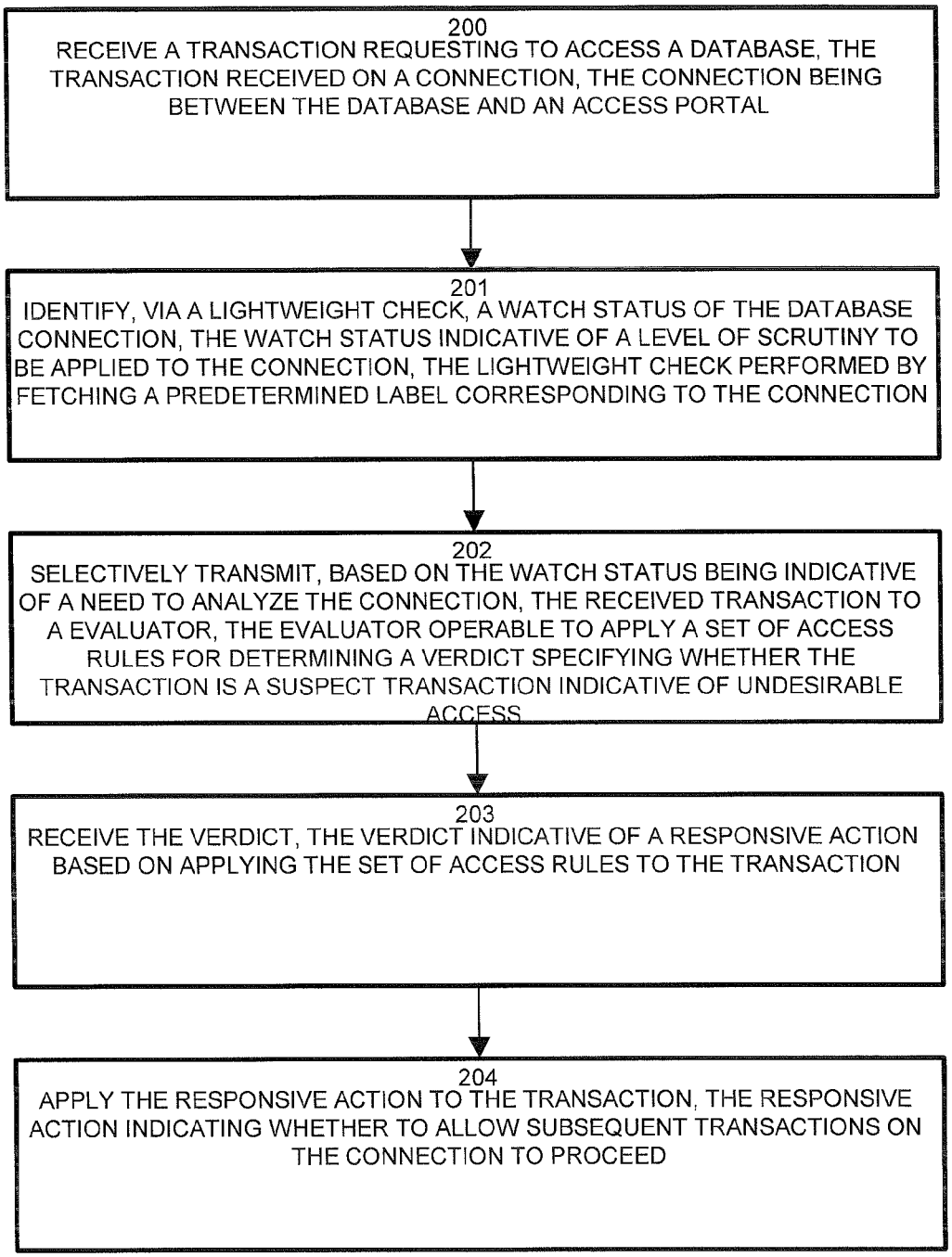
FIG. 2 shows a flowchart of processing a database transaction in the environment of FIG. 1.

FIG. 2 shows a flowchart of processing a database transaction in the environment of FIG. 1. Referring to FIGS. 1 and 2, the method of scrutinizing database 110 connections as defined herein includes receiving a transaction 152 attempting to access the database 110, as depicted at step 200, in which the transaction 152 is received on a connection between the database 110 and an access portal, or gateway 140. The security overlay approach as defined herein provides complete coverage by monitoring both the incoming network line 162 or lines, and local connections 163 via the IPC tap 158. The scrutinizer 150 identifies, via a lightweight check, a watch status of the database connection, such that the watch status is indicative of a level of scrutiny to be applied to the particular connection 163, as shown at step 201. Other connection attributes may also be employed.

The lightweight check is performed by fetching a predetermined label, discussed further below, corresponding to the connection 163. The predetermined label indicates if further scrutiny is required for the particular connection 163, or if the connection is a trusted connection, as depicted at step 202. Therefore, in the simplest case, further scrutiny can be waived for connections already deemed secure or trusted. The connection attributes may themselves indicate a responsive action, or may indicate a need to invoke the evaluator 160. Based on the check, the scrutinizer 150 selectively transmits, if the watch status or other connection attributes are indicative of a need to analyze the connection 163, the received transaction 152 to the evaluator, as shown at step 203. The evaluator 160 is operable to apply a set of access rules 166 for determining a verdict, shown by arrow 155, specifying whether the transaction 152 is a suspect transaction indicative of undesirable access. Since the lightweight check involves only a table reference of a connection attribute, the server 120 is not also excessively burdened with scrutinizing traffic on the connections 163. Since the evaluator 160 applies similar analysis to the received local transactions 152 as the network connections 162, local connections 163 are equally as protected as network connections 162, and computation for the analysis offloaded to the evaluator 160 in either case.

The scrutinizer 150 then receives the verdict 159 (FIG. 3, below), as depicted at step 204, such that the verdict 159 is indicative of a responsive action based on applying the set of access rules 166 to the transaction 152, as shown at step 204. Alternatively, the connection attributes may have been deterministic of the responsive action. The responsive action may be indicative of a need to block the communication by terminating the connection 163, or alternatively may be indicative of merely logging the transaction 152 or other suitable action. The scrutinizer 150 employs the same rule set 166 as the evaluator 160, which allows a variety of responsive actions based on a variety of observable factors, such as the set of users, weekend (i.e. off hours), not coming from a certain IP, touching (accessing) a set of objects, reading vs. changing data, etc. Further, the same rule evaluation may be used to set the watch or set the verdict and in fact the watch state can change.

For example, suppose a DBA (i.e. trusted application) begins access using a sensitive schema so the rules 166 mark the connection to be watched (i.e. delayed). Then the DBA goes and uses a less sensitive schema so the rules can set the connection to not be delayed. Now he goes back to the sensitive schema so again the rules get evaluated and cause the connection to be delayed. Then when they access sensitive data the verdict comes back to terminate the connection. Alternate responsive actions may be envisioned responsive to particular scenarios. The scrutinizer 150 applies the responsive action to the transaction 152, in which the responsive action indicates whether to allow subsequent transactions on the connection to proceed, as depicted at step 204.

Figure 3:
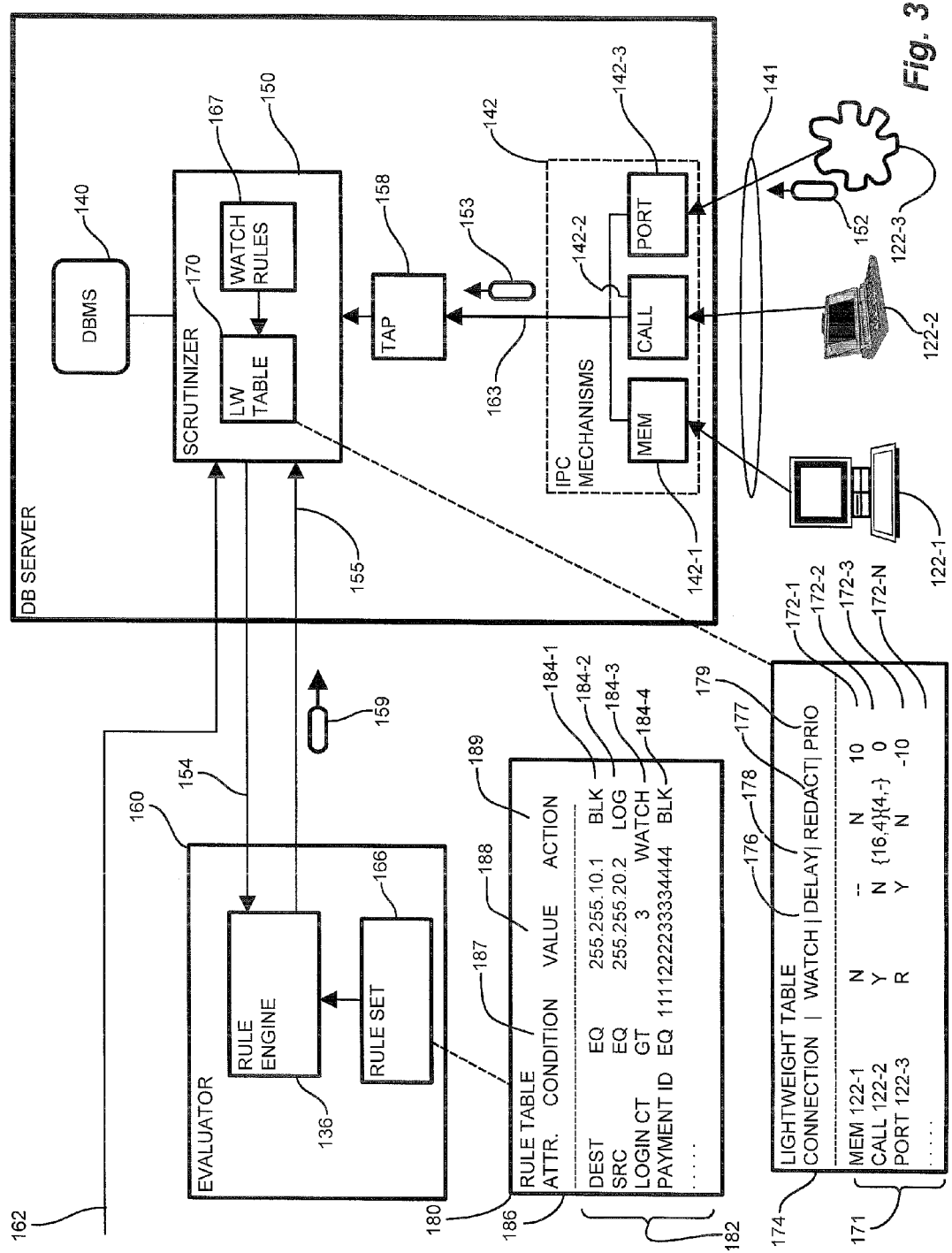
FIG. 3 shows a block diagram of a database having a security overlay as disclosed herein.

FIG. 3 shows a block diagram of a database 110 having a security overlay as disclosed herein. Referring to FIGS. 1 and 3, the DB server 120 establishes the tap 158 on the IPC mechanisms 142 employed for accessing the database 110. Typical IPC mechanisms include shared memory 142-1, kernel calls 142-2, and pipe/socket arrangements 142-3. The tap 158 intercepts incoming transactions 152 from an incoming IPC mechanism 142, and forwards the transaction 152 to the scrutinizer 150. Local user access devices, such as operator consoles 122-1, portable/wireless devices 122-2, and local networks 122-3, employ the access gateway 140 to the IPC mechanism 142 serving the DBMS 140. Alternatively, any suitable attempt that might otherwise evade the evaluator 160 may be intercepted via the tap 158; it need not be established only for local devices 122-1.

The scrutinizer 150 initializes a lightweight table 170 having entries 171 for each connection 172-1 . . . 172-N to the database 110. Each attempt to establish a connection to the database generates a corresponding entry 172 in the lightweight table 170. Upon a connection attempt, the scrutinizer 150 sends the connection request to the evaluator 160 to assess the propriety of the connection according to the rule set. Subsequent transactions 152 on the connection are correlated to the entry 172 for that connection.

The lightweight connection table 170 includes a set of attributes for each connection, including a watch indicator 176, a delay indicator 178, a redaction attribute 177 and a priority buffer 179 for each connection 171. If the connection 172 is deemed to be of a low risk, for example from a trusted operator account located in a machine room, subsequent transactions 152 need not be scrutinized by the evaluator 160, thus avoiding burdening the evaluator 160 with transactions 152 on trusted connections 171. If the connection is not exempt from scrutiny, then the watch indicator 176 is set to "Y" to forward the intercepted transactions 152 to the evaluator 160, as shown by arrow 154. Therefore, connections may be set as "don't watch" (via the connection attributes) to alleviate the volume sent to the evaluator 160. Further, since the evaluator 160 performs the rule based processing of the transactions, the server 120 is not burdened with such security processing. Only the lightweight check, involving indexing the connection 172 and checking the watch indicator 178, is performed. Other attributes may be added to the lightweight table for scrutinizing transactions 152 classified on a per-connection 171 basis. The lightweight table therefore provides a common access point on the server 120 for quickly scrutinizing transactions 152 for which a responsive action is determinable without an evaluator 160 exchange. While further lessening the processing burden, the common access point provides effective scrutiny of local and remote accesses without enumerating each individual access path (i.e. network connections, local privileged DBA accounts, other "back end" connections) into the server.

The connection attributes further include, for each entry 172, a delay indicator 178, a redaction status 177, and a priority buffering 179. The delay indicator 178 indicates if the transaction 152 is delayed pending a verdict from the evaluator 160. The redaction status, or indicator 177, designates certain portions of fields for redaction by padding with a pad character (e.g. "–"). The priority buffering 179 specifies a value that buffers, or delays, the transaction 152 to apply a priority to higher priority (i.e. less buffering delay) transactions. The priority buffering 179 may also be employed to enforce QoS (Quality of Service) provisions in service level agreements (SLAs). For example, a rule can fire that will mark a connection such that before passing the request to the database it waits for 2 milliseconds—not waiting for a verdict, just "sleeping" so that other connections get better response from the database. In this manner, the priority buffer is operable to throttle particular connections and provide better QoS to other connections.

Upon receiving an intercepted transaction 152, the evaluator 160 applies the rules from the rule set 166, and computes a verdict 159, similar to the processing performed for network communications 164. The delay indicator 178 thus causes the scrutinizer 150 to delay the transaction 152 until the verdict 159 is received from the evaluator 160, as shown by arrow 155, and is intended for those connections 174 for which the risk of even a small piece of information is substantial. If the delay indicator 179 is deemed not necessary for a connection 172, the verdict 159 is returned out of band with the intercepted transaction 152. Thus, when detecting a pattern of deviant activity, it is often that a relatively small number of offending or undesirable transactions is benign, as long as the pattern of deviant activity is detected in a timely manner, i.e. for example, denial or service attacks or mail address snoopers trying to detect a valid email.

In the example shown, the lightweight table 170 includes an entry 172 for each connection to the database. The connection 174 attribute identifies the connection so that successive transactions on the connection may be identified. The lightweight table 170 therefore adds entries 172 upon receipt of new connections and removes the entry 172 when the connection is terminated. The example entries include a connection 172-1, emanating from user device 122-1 and employing a shared memory IPC mechanism. This connection 172-1 is for a trusted machine room device and is deemed not to be a risk, so the lightweight check by the scrutinizer 150 allows transactions to pass. Connection 172-2, from laptop device 122-2, is set to watch 176 value of Y (send to evaluator 160), however without a delay 178, thus transactions 152 are permitted to pass until the evaluator 160 returns an unfavorable verdict 159. Connection 172-3, from a network 122-3, is set to a watch 178 of "R" to allow responses to pass, and only check requests, however to delay the requests until the verdict 159 is received (delay="Y"). Such an approach will delay the request, but once permitted will allow the entire response transaction 190 through, facilitating throughput when the requests yields many packets (i.e. rows) of data. In a typical arrangement, each packet of the transaction 152 would represent a line of a SQL query, and each response includes a packet for one or more rows. Not all servers will employ multiple IPC mechanisms 142. Either a request (query) to the database or the response from the database may represent multiple portions. Accordingly, the request or response may be taken as complete when the first portion of the corresponding reply is seen on the connection.

Upon completing of evaluation, the evaluator 160 returns the verdict 159 to indicate the result of the evaluation. If the verdict 159 indicates undesirable message traffic, then the scrutinizer 150 shuts down the connection 172, thus blocking subsequent message traffic. Alternatively, the evaluator 160 may operate in a monitor only mode in which questionable activity patterns are logged for audit purposes, but not restricted entirely.

The rule set 166 applied by the evaluator 160 is typically arranged in the form of a rule table 180, although alternative approaches and structures may be employed. In the example configuration, the rule table 180 includes a set of entries 182 for rules 184-1 . . . 184-N (184 generally) to be applied by the evaluator 160. Such rules 184 may be numerous and highly granular, or may be merely screen for particular attributes and/or warning flags, as disclosed in copending U.S. patent application Ser. No. 10/723,521, filed Nov. 26, 2003, entitled "SYSTEM AND METHODS FOR NONINTRUSIVE DATABASE SECURITY". The example rule employed by way of illustration each include, for each entry 184, an attribute 186, a condition 187, a match value 188, and an responsive action 189 to render as the verdict 159 if the rule is triggered.

For example, entry 184-1 examines transactions for a particular destination (attribute 186), such as an IP address, based on a condition 187 such as an equality (EQ), to a value 188 (IP address 255.225.10.1), and returns an action 189 to block the transaction 152 (i.e. shut down the connection 172). Entry 184-2 blocks transactions 152 emanating from (source attribute 186) address 2555.225.20.2, and merely to log such transactions. Rule entry 184-3 looks for a pattern defined by more that 3 attempts to login, and returns a responsive action 189 of block. Rule entry 184-4 examines a masked portion of a sensitive attribute, such as a credit card number, and returns a verdict based on only the masked portion. The verdict 159 returned from a particular rule 184 may also indicate to modify the watch status or the delay status of the particular connection 172 in the lightweight table 170.

It should be noted that alternate arrangements may apply multiple network connections, or may apply only scrutinizer based monitoring. Such scrutinizer 150 based monitoring need not be performed only on local connections 163, and in operation involves performing the lightweight check to screen connections, followed by the evaluator 160 exchange for watched connections 172.

Figure 4:
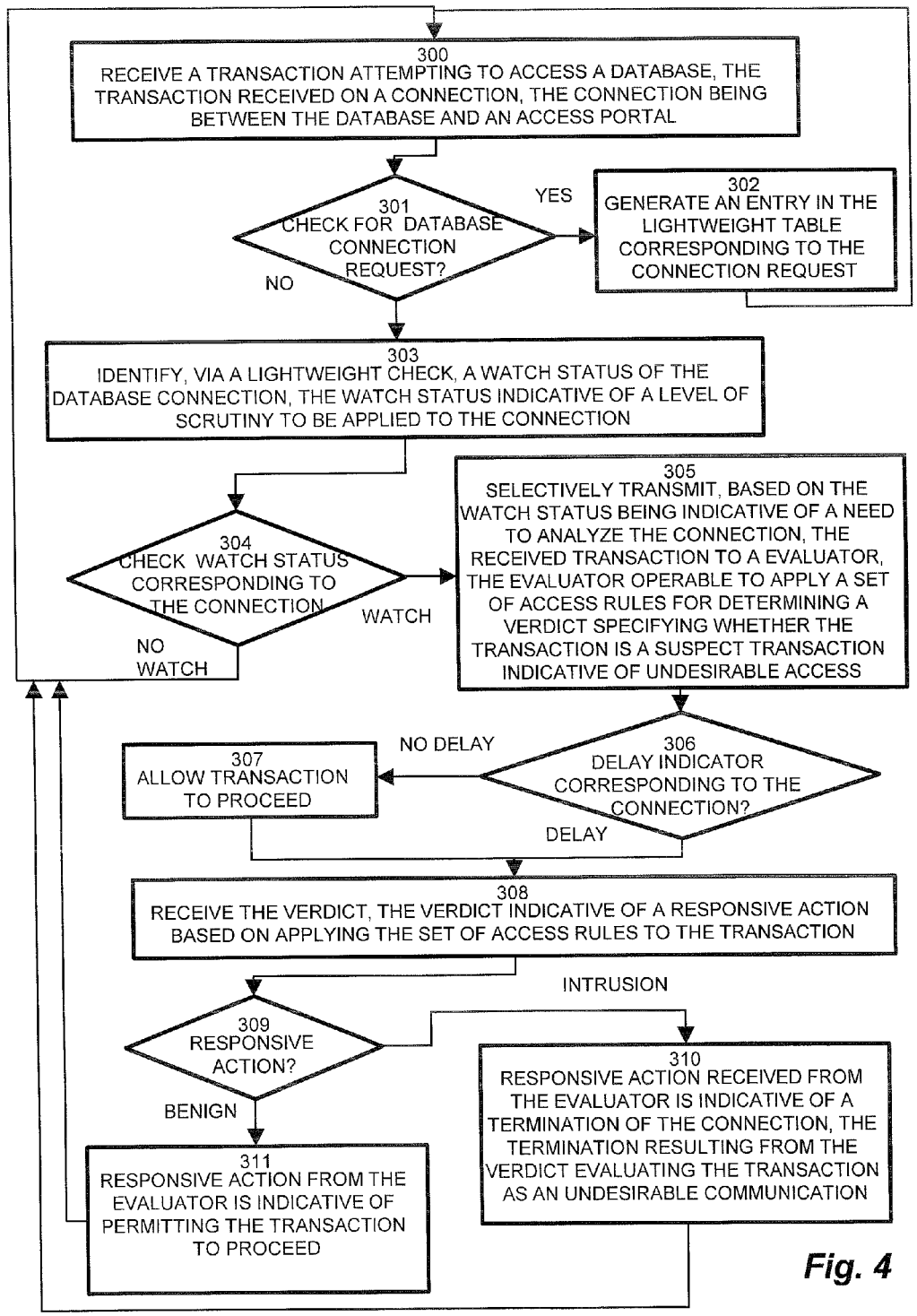
FIG. 4 shows a flowchart of control flow of the database security overlay operation in the environment of FIG. 3
Figure 5:
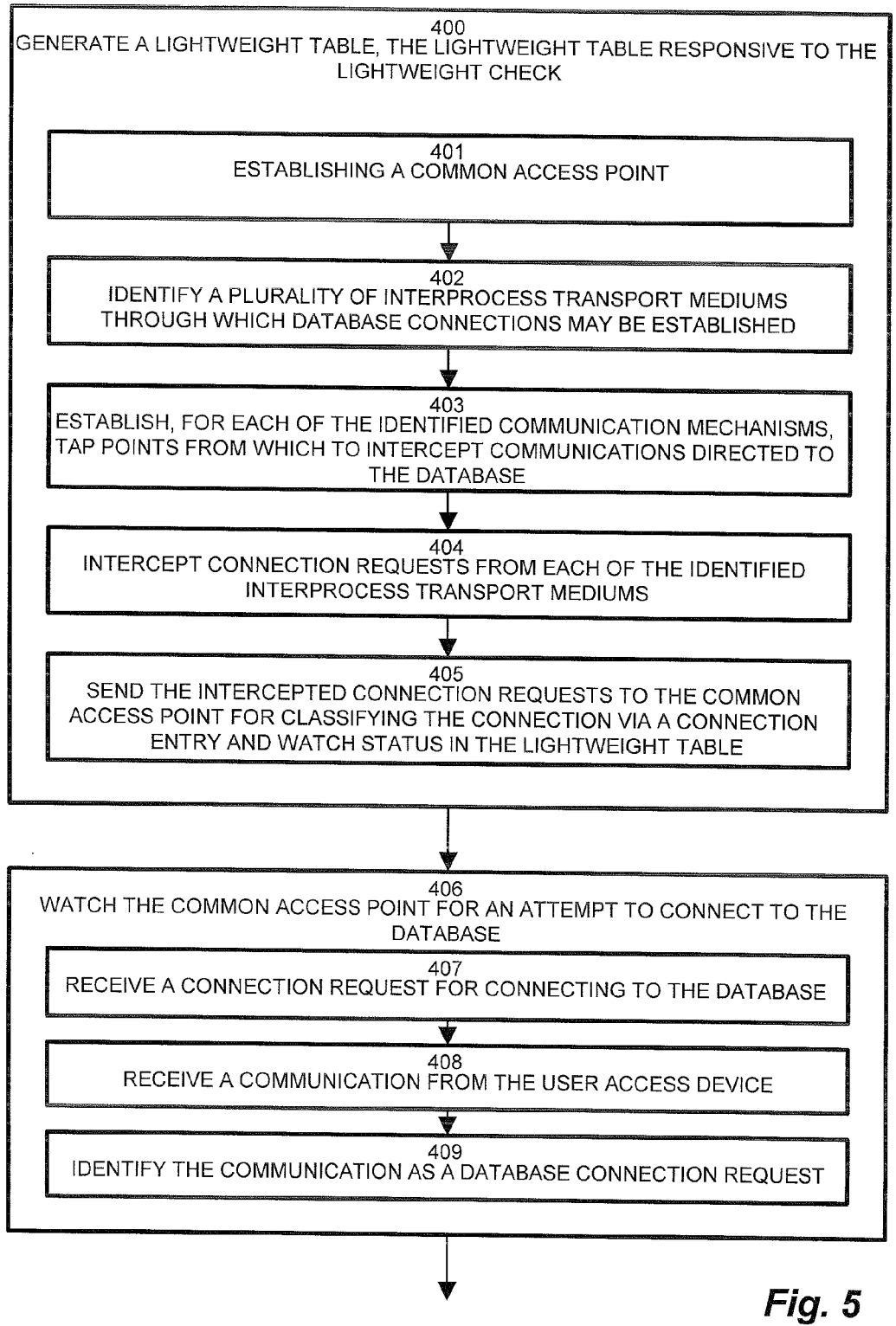
FIGS. 5-8 show a flowchart of processing flow in the database security overlay operation in the environment of FIG. 3
Figure 6:
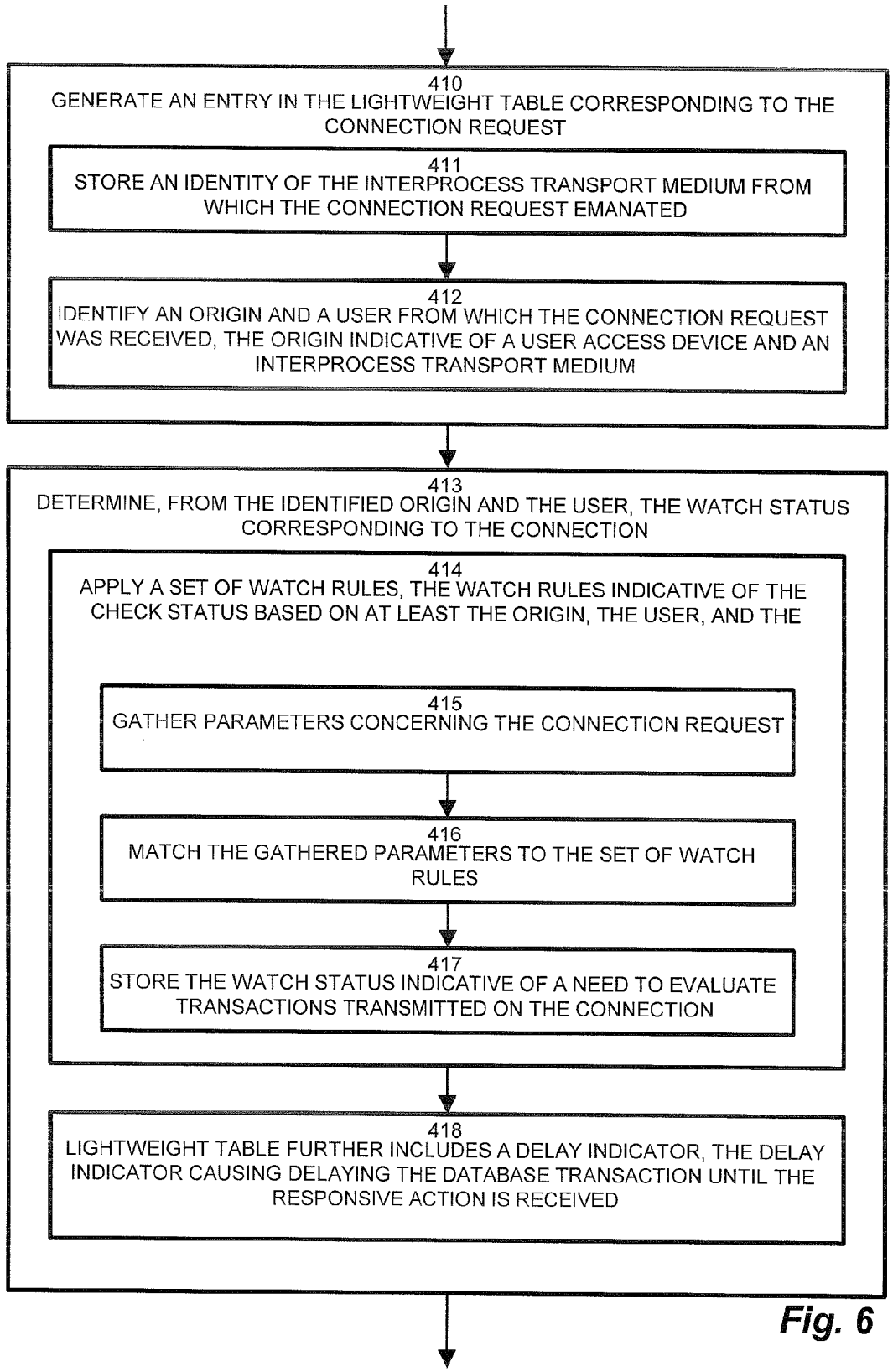
Figure 7:
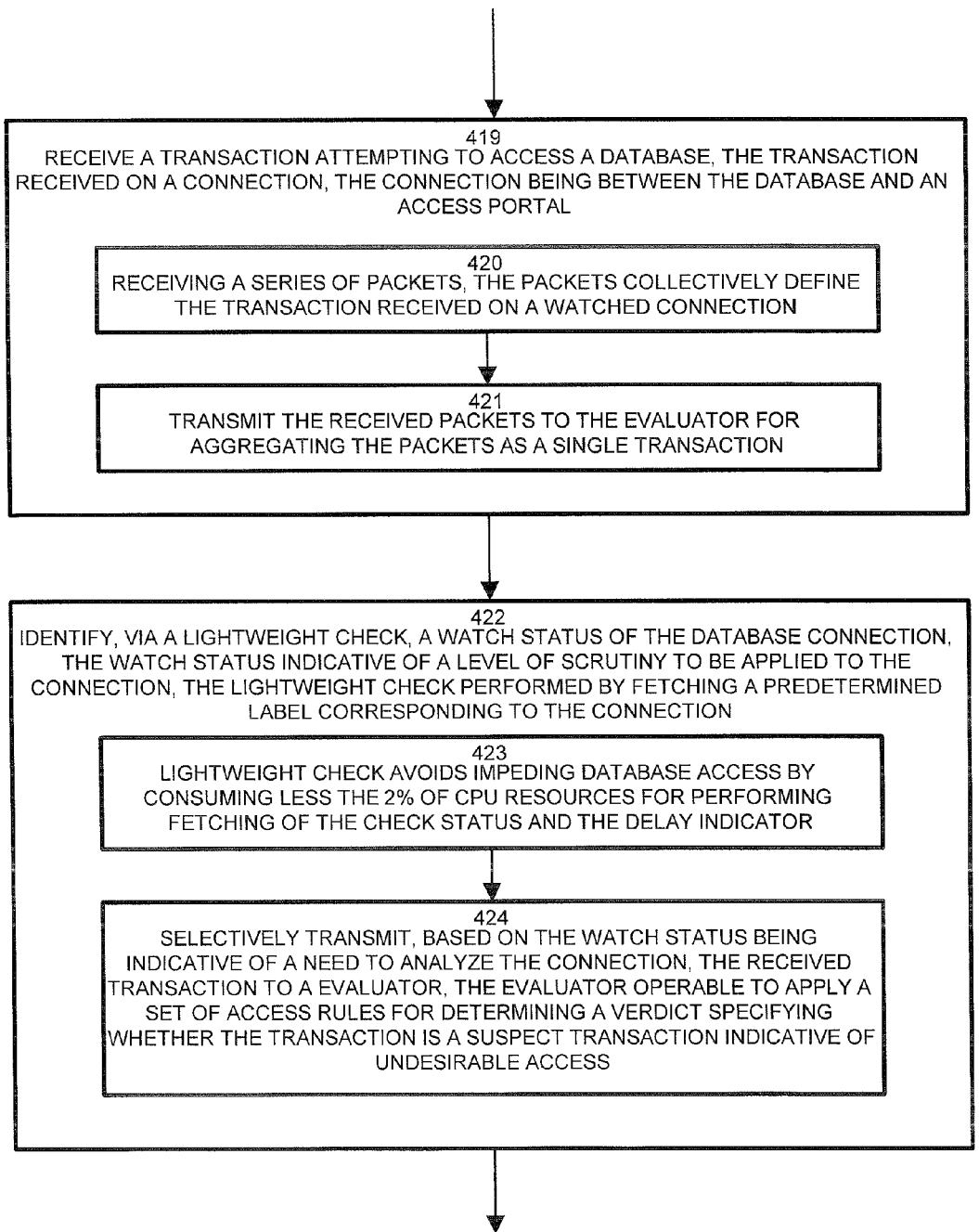
Figure 8:
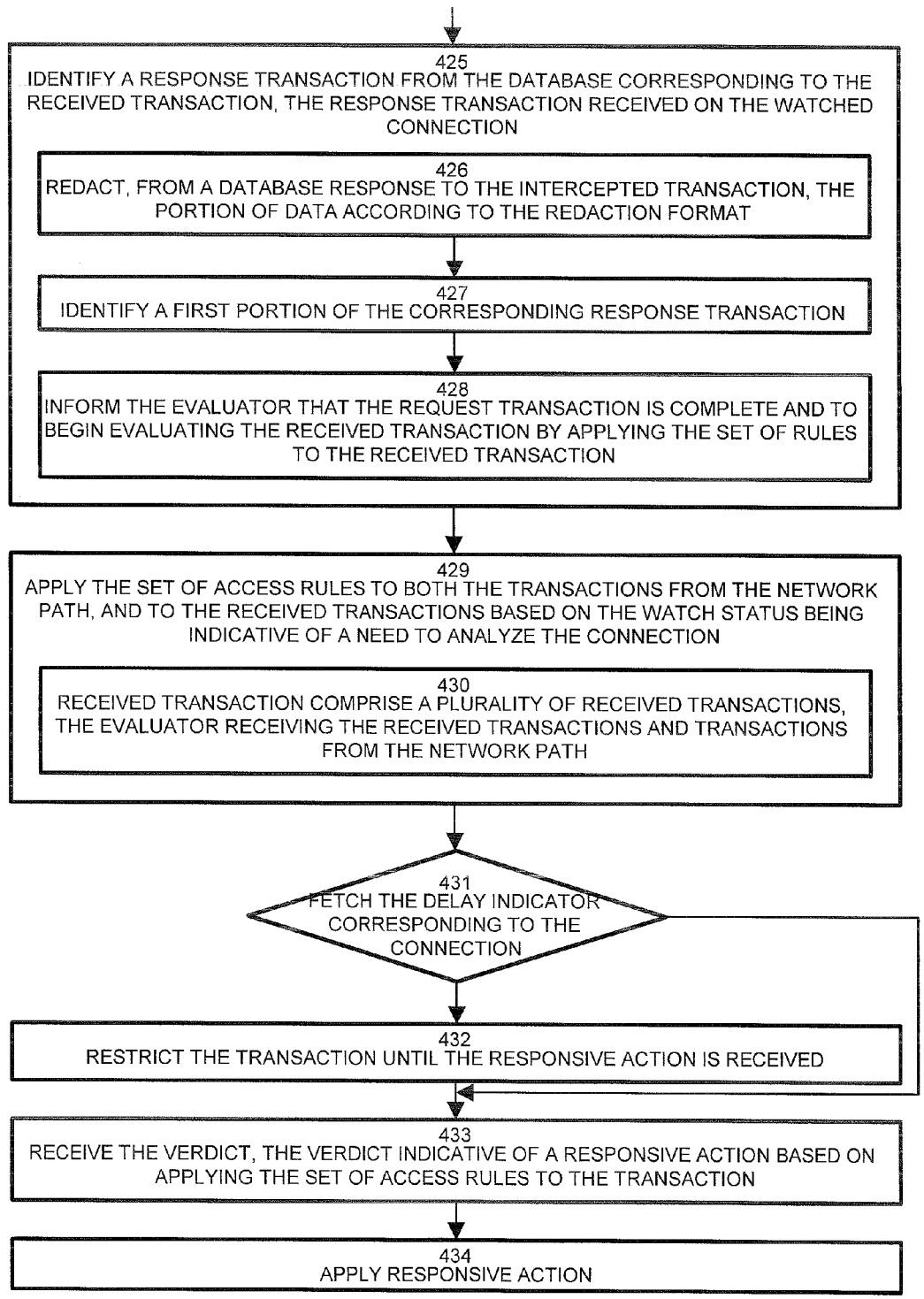

FIG. 4 shows a flowchart of control flow of the database security overlay operation in the environment of FIG. 3. Referring to FIGS. 1, 3 and 4, in a particular configuration, the method of scrutinizing database connections 163 includes receiving a transaction 152 attempting to access a database 110 between the database and an access portal 140, as depicted at step 300. Each database session from a user or application involves an initial connection request, followed by a series of transactions 152 over the connection if the connection request was successful. Each transaction is defined in one or more packets, and includes request transactions 152 to the database 110, and response transactions 190 from the database 110. A check is performed, at step 301, to identify the communication as a database connection request. If the transaction 152 is a connection attempt, then the scrutinizer 150 creates an entry 172 in the lightweight table 170 for the connection, as shown at step 302. Each entry 172 includes the watch indicator 176 and delay indicator 178.

If the transaction 152 corresponds to an existing connection 172, then the scrutinizer 150 identifies, via a lightweight check, the watch status 176 of the database connection 172, such that the watch status 176 is indicative of a level of scrutiny to be applied to the connection, as shown at step 303. The lightweight check is performed by fetching a predetermined label (i.e. watch attribute 176) corresponding to the connection 172 to minimize the processing burden overhead on the server 120. A check is performed, at step 304, to evaluate the watch status 304 of the connection. The watch status 176 may be "Y", indicating that the transaction 152 is to be analyzed by the evaluator, a "N" indicating a trusted connection 172 with no need for further analysis, or an "R", indicating that database responses 190 may be ignored following an allowed request 152. Ignoring responses 190 is beneficial when the responses are large compared to the request. In a large database 110, a single request may generate multiple packets in a response transaction. If the request determines that the content of the response is benign, there is no reason to burden the evaluator 160 with analyzing each individual packet in the response transaction 190.

The scrutinizer 150 selectively transmits, based on the watch status 176 being indicative of a need to analyze the connection 172, the received transaction 152 to the evaluator 160. The evaluator is operable to apply the set of access rules 166, as with network transactions 164, for determining a verdict 159 specifying whether the transaction 152 is a suspect transaction indicative of undesirable access, as shown at step 305. The lightweight table 170 further includes a delay indicator 178, which causes the scrutinizer 150 to delay the database transaction 152 until the responsive action is received from the evaluator 160, as shown at step 306. If the check at step 306 indicates a delay from the delay indicator 178 corresponding to the connection 172, the scrutinizer 150 restricts (i.e. blocks) the transaction 152 until the responsive action is received from the evaluator 160. While possibly imposing a small delay on DB response, this setting ensures that no sensitive data is obtained during the evaluator 160 analysis. If the delay indicator 158 is not set, the transaction 152 is allowed to proceed pending subsequent shutdown of the connection 172 if the verdict indicates so, as shown at step 307.

Upon completion by the evaluator 120, the scrutinizer 150 receives the verdict 159 indicative of a responsive action based on applying the set of access rules 166 to the transaction 152, as shown at step 308. A check is performed at step 309, and if the responsive action received from the evaluator 160 is indicative of a termination of the connection 172 resulting from the verdict 159 evaluating the transaction 152 as an undesirable communication, the scrutinizer 150 terminates and deletes the connection 172 from the lightweight table 170, as depicted at step 310. If the responsive action from the evaluator 160 is indicative of permitting the transaction 152 to proceed, the transaction 152 may be merely logged at the evaluator 160, as shown at step 311.

FIGS. 5-8 show a flowchart of processing flow in the database security overlay operation in the environment of FIG. 3. Referring to FIGS. 1, 3 and 5-8, an example configuration of database transaction processing is shown according to a particular iteration through the control flow of FIG. 4. The evaluator 150 generates the lightweight table 170 responsive to the lightweight check, as depicted at step 400, in which generating includes establishing a common access point such as the IPC intercept 142, as disclosed at step 301, and identifying a plurality of interprocess transport mediums 142-1 . . . 142-3 through which database connections 172 may be established, as shown at step 402. The server 120 establishes, for each of the identified communication mechanisms, tap points 158 from which to intercept communications directed to the database 110, as depicted at step 403. The tap 158 is then operable for intercepting connection requests from each of the identified interprocess transport mediums 142-N, as shown at step 404. The IPC mechanisms 142-1 ... 142-3 send the intercepted connection requests 153 to the common access point defined by the tap 158 for classifying the connection via a connection entry 172 and watch status 176 in the lightweight table 170, as shown at step 405.

The tap 158 watches the common access point (i.e. IPC mechanisms 142 set up for interception) for an attempt to connect to the database 110, as shown at step 406. The evaluator 160 receives a connection request 153 for connecting to the database, as shown at step 407, by receiving a communication 152 from the user access device 122 or other user portal 141 such as an application, and identifies the communication as a database connection request 153 as distinguished from a database request transaction 152 corresponding to an existing connection 172, depicted at steps 408 and 409.

The new connection request 153 generates an entry 172 in the lightweight table 170 corresponding to the connection request 153, as depicted at step 410. This includes storing an identity of the interprocess transport medium 142 from which the connection request emanated, as shown at step 411, and identifying an origin and a user from which the connection request 153 was received, such that the origin is indicative of a user access device 122, as shown at step 412.

The scrutinizer 150 determines, from the identified origin and the user, the watch status 176 corresponding to the connection 172 for storing in the watch status attribute 176 as depicted at step 413. Determining the watch status 176 further includes applying a set of watch rules 167, in which the watch rules 167 are indicative of an initial state of entries in the lightweight table 170. Subsequent responsive actions may modify the state of the lightweight table by modifying the connection attributes therein. Initially, such connection attributes include the watch status 176 based on at least the origin, the user, and the content of the connection request 153, the delay status 178, a redaction status 177, and a priority buffering 179, as shown at step 414. In the example arrangement, the watch rules 167 are derived from the full rule set 166, and used for initially classifying the watch status 176 for a particular connection 171. In the example shown, the scrutinizer 150 gathers parameters concerning the connection request, as shown at step 415, matches the gathered parameters to the set of watch rules 167, as depicted at step 416, and stores the watch status indicative of a need to evaluate transactions 152 transmitted on the connection 172, as disclosed at step 417. The lightweight table 170 also stores the delay indicator 178 attribute, in which the delay indicator 178 causes the scrutinizer to delay the database transaction 190 until the responsive action is received in the verdict 159, as depicted at step 418.

Once establishing a connection entry 172, the scrutinizer 150 monitors incoming traffic until receiving a transaction 152 attempting to access the database 110, such that the transaction 152 is received on a connection between the database 110 and an access portal 141, as shown at step 419. In the example arrangement, employing SQL and TCP/IP, the received transaction 152 further includes a set of portions, such that each portion is contained in a packet, as depicted at step 420, thus receiving a series of packets that collectively define the transaction received on a watched connection 172. The received packets are aggregated as a single transaction, as depicted at step 421.

The scrutinizer 150 therefore receives a request transaction 152, which in a typical exchange implies that the request transaction 152 triggers a response transaction 190 by the database 110. Since the request 152 may not be identified as completed until the corresponding response 190 is received for the connection 172 from the database 110, the scrutinizer 150 permits each of the portions of the request transaction 152 to transmit to the database 110.

The scrutinizer 150 identifies, via a lightweight check, the watch status 176 of the database connection 172, such the at the watch status 176 is indicative of a level of scrutiny to be applied to the connection 172, as shown at step 422. The lightweight check is performed by fetching a predetermined label (i.e. watch status attribute) corresponding to the connection 172 from the lightweight table 170. The lightweight check avoids impeding database access by consuming less the 2% of CPU resources for performing fetching of the watch status 176 and the delay indicator 178, as depicted at step 423. Performance thresholds may be established such that the lightweight check consumes no more than a predetermined portion of CPU time, such as 3% or 4%, for example, however any suitable threshold may be established. The scrutinizer 150 selectively transmits, based on the watch status 176 being indicative of a need to analyze the connection 172, the received transaction 152 to the evaluator 160, such that the evaluator 150 applies a set of access rules 166 for determining a verdict 159 specifying whether the transaction 152 is a suspect transaction indicative of undesirable access, as disclosed at step 424.

The scrutinizer 150 identifies the response transaction 190 from the database 110 corresponding to the received transaction 152, since the response transaction 190 is received on the same watched connection 172, as disclosed at step 425. In particular configurations, the evaluator 160 may redact, from a database response 190 to the intercepted transaction, a portion of data according to a redaction format, such as for blanking parts of credit card numbers, as depicted at step 426. The scrutinizer 150 identifies a first portion (i.e. packet) of the corresponding response transaction, as shown at step 427, and informs the evaluator 160 that the request transaction 152 is complete and to begin evaluating the received request transaction 152, as depicted at step 428, thus instructing the evaluator 160 to commence analyzing the transaction by applying the set of rules 166 to the received transaction 152.

In the example arrangement shown, the evaluator 160 is disposed on the network path 162 to the database 110. Therefore, during operation, the evaluator 160 is operable to apply the set of access rules 166 to both the transactions from the network path 162, as depicted at step 429. As the received transaction 152 may comprise a plurality of received transactions 152, the evaluator 160 receives the received transactions 152 and transactions from the network path 164, as shown at step 430.

As the start (first packet) of the response transaction 190 is received by the scrutinizer 150, the evaluator 160 fetches the delay indicator 178 corresponding to the connection 172 to check if the response is to be delayed until the verdict is received, as shown at step 431. If so, then the scrutinizer 150 restricts the transaction 190 until the responsive action (verdict) 159 is received, as shown at step 432. The evaluator 160 may also identify, from the intercepted transaction 152, a portion of data for redaction, and applying an indication of the redaction and a redaction format corresponding to the portion of data. Alternate augmentation qualifiers and formats may be applied in alternate configurations. In either case, the scrutinizer receives the verdict indicative of a responsive action based on applying the set of access rules 166 to the transaction 152, as depicted at step 433. As indcted above, if the evaluator 160 determines an undesirable or inappropriate transaction 152, the responsive action received from the evaluator is indicative of a termination of the connection 172. The scrutinizer 150 then applies the responsive action to the transaction, such that the responsive action indicates whether to allow subsequent transactions 152 on the connection to proceed, as shown at step 434. Note that the responsive action may also modify the watch rules 167 or perform other actions than termination. For example, a verdict may indicate that a particular connection should be modified to change the delay attribute 178 to "Y" to delay subsequent transactions 152 on that connection.

In alternate configurations, various augmentations and formats may be identified by the scrutinizer and apply to the corresponding response transaction. For example, the redaction specifier discussed above may take the following form: The intercept 142 will send the tap 158 a set of string 3-tupples as regular expressions. The first one means "this is the expression that needs to be asked", a second is "this is the mask" and the third is a character. E.g. the first element can be [0-9] {16} is a credit card and the second [0-9] {12} meaning mask out the first 12 and the third may be a benign filler such as '-' such that 1111222233334444 as is analyzed as ------------4444. A particular rule type informs the scrutinizer that the responsive action will replace the strings with the redaction/filler in the response transaction.

Other scenarios and database environments may present access issues different from or in addition to the data level access for a trusted application as discussed above. An exemplary list follows, however there maybe other environments for which the disclosed approach is beneficial and this list is not meant to be exclusive.

Compliance with cross-border data access requirements—Similar to the previous discussion of application and data segmentation, but since these requirements are very well-defined and always require guaranteed prevention they form a separate use case.

Separation of duties—There are often requirements to require more than one person to collectively perform a highly-privileged activity. This is hard or impossible to implement when users have all privileges. Preventing based on multiple factors is used to implement such schemes (metaphorically—similar to two people turning a key to launch a missile). This use case includes handling of patch installations, upgrades, backups, replication changes etc. This use case is also relevant when database links are involved and where data from one application is exposed through another, and the linked application cannot rely on the security rules built into the linking application.

Implementation of encryption schemes—There are two types of implementations for encryption of data-at-rest. One is based on storage encryption where the data is encrypted on-disk. This provides protection from media theft. Access to data through the database is not affected. In this case prevention is used as an access control mechanism and the use case defaults generally to a DBA scenario, discussed above. The second scheme uses application-level encryption usually through database procedures that do the encryption (e.g. DBMS_CRYPTO in Oracle and the Crypto API in SQL Server). In this case the encryption keys are often stored in the database within tables. Prevention is then used to ensure that DBAs do not access the encryption keys. This is another special case similar to the DBA example presented above.

External policy definition for legacy applications with limited access control—Applications (especially legacy application and database schemas that are part of a purchased application) often have very limited built-in schema access control. It is not possible to change these applications and yet access control is mandated by regulations. In order to maintain compliance and not have to replace applications, external prevention is used.

Data leak prevention, reporting and notification support—Vulnerabilities in application and lax access control definitions increase the risk of leakage of sensitive data. This is different from the DBA scenario since the access is harder to predict (based on user) and because the access pattern involves not only credentials but also volume. For example, a vulnerable script or application can be changed to extract ALL records from the database. Prevention is based on extrusion of data and not on access. Prevention in this case is coupled with reporting to support notification—e.g. rather than have all 2 million customer records extracted, terminate the connection as soon as the breach is identified (e.g. after access to 250 records), report on which 250 records were extracted and supply the records to allow notifying only these 250 customers.

Rogue application prevention—Application data in the database should only be accessed and changed through the application. However, access control is almost always exclusively based on user name. Compliance requirements often specify that changes to data (and sometimes also access to data) should only be made through the application where application-level security is enforced. Any connection from another application, script or tool should be prevented. An example is the use of Excel to connect to the database, extract data and even change data using VBA.

Enforcement of change request process—Most customers manage DBA tasks in a change request/ticketing system. When a DBA needs to perform their work they should have a valid ticket number that references at least the instance. Most customers rely on auditing and reconciliation of activities produced by the auditing system with the ticket description. A more advanced approach is to require ticket information to be entered as part of the session and preventing certain activities if the ticket number is invalid or is not related to the instance. This can be used for all DBA work or, more likely, for security-affecting work such as changes to authentication attributes, changes to encryption options, changes to backup options, etc.

Those skilled in the art should readily appreciate that the programs and methods for providing an intrusion blocking security overlay as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example as in an electronic network such as the Internet or telephone modem lines. Such delivery may be in the form of a computer program product having a computer readable storage medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for intrusion blocking security overlay has been particularly shown and described with references to embodiments thereof, it will be understood by those skilled in the art that various changes in form and details may be made therein without departing from the scope of the invention encompassed by the appended claims.

What is claimed is:

1. A method of scrutinizing database connections comprising:
receiving a transaction requesting to access a database, the transaction received on a connection, the connection being between the database and an access portal of a server operable to access the database;
identifying, via a lightweight check, a set of connection attributes corresponding to the connection and determining a level of scrutiny to be applied to the connection based on the connection attributes, wherein the connection attributes indicate the level of scrutiny;
selectively transmitting, based on the connection attributes being indicative of a need to analyze the connection, the received transaction to an evaluator, the evaluator operable to apply a set of access rules for determining a verdict specifying whether the received transaction is a suspect transaction indicative of undesirable access, the selectively transmitting further comprising:
computing the verdict at the evaluator by applying the set of access rules to the received transaction, the evaluator distinct from the server operable to access the database and having separate computing resources; and
receiving the verdict, the verdict indicative of a responsive action based on applying the set of access rules to the received transaction;
computing, from the connection attributes, the responsive action when the connection attributes do not indicate that the received transaction is a suspect transaction indicative of undesirable access and the need for analyzing the received transaction at the evaluator; and
applying the responsive action to the received transaction.

2. The method of claim 1 wherein the connection attributes are indicative of the responsive action, further comprising:
computing, from the connection attributes for the connection, the responsive action;
applying the computed responsive action to the received transaction; and
selectively allowing the received transaction to proceed, based on the computed responsive action, independently of an exchange with the evaluator.

3. The method of claim 1 wherein the lightweight check further comprises a first stage screening of a set of connection attributes of the received transaction, and determining a verdict comprises a second stage, the first stage occurring via a common access point on the server.

4. The method of claim 1 further comprising:
generating a lightweight table, the lightweight table responsive to the lightweight check, generating the lightweight table including:
receiving a connection request for connecting to the database; and
identifying the connection attributes of the connection request, the connection attributes further defining an origin and a user from which the connection request was received, the origin indicative of a user access device and an interprocess transport medium, the connection attributes including a watch status corresponding to the received transaction, the watch status indicating whether to transmit transactions on the connection to be analyzed by the evaluator.

5. The method of claim 3 wherein the connection attributes include a watch status, the watch status indicative of whether to invoke the second stage for the connection.

6. The method of claim 1 further comprising:
defining, for the connection, a redaction indicator as a connection attribute;
identifying, from the received transaction, a portion of data for redaction;
applying an indication of the redaction and a redaction format corresponding to the portion of data;
analyzing the received transaction including the portion of data for redaction;
redacting, from a database response to the received transaction, the portion of data according to the redaction format.

7. The method of claim 1 wherein the connection attributes further include a delay indicator, the delay indicator causing delaying a response to a client until the responsive action is received, wherein identifying further comprises:
fetching the delay indicator corresponding to the connection; and
restricting the received transaction until the responsive action is received.

8. The method of claim 4 wherein receiving the connection request further comprises:
receiving a communication from the user access device;
identifying the communication as a database connection request;
generating an entry in the lightweight table corresponding to the connection request;
storing an identity of the interprocess transport medium from which the connection request emanated; and
storing the connection attributes indicative of a need to evaluate transactions transmitted on the connection.

9. The method of claim 4 wherein generating the lightweight table further comprises:
establishing a common access point for transactions;
watching the common access point for an attempt to connect to the database;
gathering parameters concerning the connection request; and
matching the gathered parameters to the set of access rules.

10. The method of claim 9 wherein establishing the common access point further comprises:
identifying a plurality of interprocess transport mediums through which database connections may be established;
establishing, for each of the identified interprocess transport mediums, tap points from which to intercept communications directed to the database;
intercepting connection requests from each of the identified interprocess transport mediums; and
sending the intercepted connection requests to the common access point for classifying the connection via a connection entry and watch status in the lightweight table.

11. The method of claim 1 wherein the responsive action received from the evaluator is indicative of a termination of the connection, the termination resulting from the verdict evaluating the received transaction as an undesirable communication.

12. The method of claim 1 wherein the responsive action from the evaluator is indicative of permitting the received transaction to proceed and logging the received transaction at the evaluator.

13. The method of claim 1 wherein the connection attributes further include a priority buffer, the priority buffer causing a delay of a transaction requesting access to the database for permitting higher priority requests to proceed, further comprising:

receiving the request for database access;
fetching the priority buffer value corresponding to the connection; and
delaying the request for a duration corresponding to the priority buffer value.

14. The method of claim 1 wherein the received transaction further includes a set of portions, each portion contained in a packet, further comprising:
receiving a series of packets, the packets collectively defining a transaction received on a watched connection;
transmitting the received packets to the evaluator for aggregating the packets as a single transaction;
identifying a response transaction by the database corresponding to the defined transaction, the response transaction received on the watched connection; and
instructing the evaluator to commence analyzing the defined transaction by applying the set of access rules to the defined transaction.

15. The method of claim 14 wherein analyzing the defined transaction further comprises:
receiving a request transaction, the request transaction triggering the response transaction by the database;
permitting each portion of the request transaction to transmit to the database;
identifying a first portion of the corresponding response transaction; and
informing the evaluator that the request transaction is complete and to begin evaluating the defined transaction.

16. The method of claim 1 wherein the lightweight check avoids impeding database access by consuming less than 2% of CPU resources for performing fetching of the connection attributes.

17. The method of claim 11 further comprising, following termination of a connection based on a responsive action, causing the server to perform a rollback of the received transaction causing the termination to restore the database to a state immediately prior to the received transaction.

18. The method of claim 1 wherein performing the lightweight check comprises fetching a predetermined label corresponding to the connection, the predetermined label based on comparing the connection attributes to the transactions on the connection.

19. The method of claim 1 wherein the responsive action is indicative of at least one of a treatment for the received transaction and a state change modifying the rules indicating whether to allow subsequent transactions on the connection to proceed.

20. A data security appliance for monitoring database connections comprising:
an evaluator having a memory, a processor, a network interface, and a coupling to a database server performing database access requests via the database connections;
the coupling responsive to an IPC intercept on the database server for receiving a transaction requesting to access a database, the transaction received on a connection, the connection being between the database and an access portal of the database server;
the IPC intercept providing the received transaction to a scrutinizer for identifying, via a lightweight check, a set of connection attributes of the connection and determining a level of scrutiny to be applied to the connection based on the connection attributes, the connection attributes indicating the level of scrutiny and the lightweight check performed by fetching a predetermined label corresponding to the connection;
the scrutinizer selectively transmitting, based on the connection attributes being indicative of a need to analyze the connection, the received transaction to the coupled evaluator, the evaluator having a set of access rules for determining a verdict specifying whether the received transaction is a suspect transaction indicative of undesirable access;
the evaluator invoking the coupling for sending the verdict to the scrutinizer, the verdict indicative of a responsive action based on applying the set of access rules to the received transaction;
the scrutinizer responsive to the verdict for applying the responsive action to the received transaction, the responsive action indicating at least one of:
permitting the received transaction; and
modifying the set of access rules to apply to subsequent transactions; and
the scrutinizer computing, from the connection attributes, the responsive action when the connection attributes do not indicate that the received transaction is a suspect transaction indicative of undesirable access and the need for analyzing the received transaction at the evaluator.

21. The appliance of claim 20 wherein the scrutinizer is coupled to the evaluator and further comprises:
a lightweight table, the lightweight table responsive to the lightweight check, wherein the scrutinizer:
receives a connection request for connecting to the database;
identifies the connection attributes of the connection, the connection attributes further defining an origin and a user from which the connection request was received, the origin indicative of a user access device and an interprocess transport medium for identifying successive transactions on the connection; and
determines, for the connection, the connection attributes, the connection attributes including at least one of a watch status, a delay indicator, a redaction indicator and a priority buffer corresponding to the connection.

22. The appliance of claim 21 wherein the scrutinizer:
identifies a plurality of interprocess transport mediums through which database connections may be established;
establishes, for each of the identified interprocess transport mediums, tap points from which to intercept communications directed to the database;
intercepts connection requests from each of the identified interprocess transport mediums; and
sends the intercepted connection requests to a common access point for classifying the connection via a connection entry and watch status in the lightweight table.

23. The appliance of claim 22 wherein the evaluator is coupled to the scrutinizer for receiving each of a plurality of transactions directed to the database server, the scrutinizer further identifying each interprocess transport medium employed for database access.

24. A computer program product having a non-transitory computer readable storage medium operable to store computer program logic embodied in computer program code encoded as a set of processor based instructions thereon, that, when executed by the processor cause the computer to perform steps for scrutinizing database connections comprising:
computer program code for receiving a transaction requesting to access a database, the transaction received on a connection, the connection being between the database and an access portal; computer program code for identifying, via a lightweight check, a set of connection attributes corresponding to the connection and determining a level of scrutiny to be applied to the connection based on the connection attributes, the connection attributes indicating the level of scrutiny and the lightweight check performed by fetching a predetermined label corresponding to the connection; computer program code for selectively transmitting, based on the connection attributes being indicative of a need to analyze the connection, the received transaction to an evaluator, the evaluator operable to apply a set of access rules for determining a verdict specifying whether the received transaction is a suspect transaction indicative of undesirable access; computer program code for receiving the verdict, the verdict indicative of a responsive action based on applying the set of access rules to the received transaction; computer program code for computing, from the connection attributes, the responsive action when the connection attributes do not indicate that the received transaction is a suspect transaction indicative of undesirable access and the need for analyzing the received transaction at the evaluator; and computer program code for applying the responsive action to the received transaction.

* * * * *